US006072482A

United States Patent [19]
Moon et al.

[11] Patent Number: 6,072,482
[45] Date of Patent: Jun. 6, 2000

[54] MOUSE MODE MANAGER AND VOICE ACTIVATION FOR NAVIGATING AND EXECUTING COMPUTER COMMANDS

[75] Inventors: Billy Gayle Moon, Apex; Brian Bankler, Cary; Vikas Jain, Durham, all of N.C.

[73] Assignee: Ericsson Inc., Research Triangle Park, N.C.

[21] Appl. No.: 08/924,265

[22] Filed: Sep. 5, 1997

[51] Int. Cl.⁷ .................................................. G06F 3/14
[52] U.S. Cl. ..................... 345/333; 345/156; 345/163; 345/173
[58] Field of Search ..................... 345/333, 156, 345/163, 146, 145, 173, 347

[56] References Cited

U.S. PATENT DOCUMENTS

| | | | |
|---|---|---|---|
| 4,587,630 | 5/1986 | Straton et al. | 345/173 |
| 5,565,894 | 10/1996 | Bates et al. | 345/173 |
| 5,589,856 | 12/1996 | Stein et al. | 345/173 |
| 5,621,906 | 4/1997 | O'Neil et al. | 345/349 |
| 5,748,191 | 5/1998 | Rozak et al. | 345/333 |
| 5,764,218 | 6/1998 | Della Bona et al. | 345/157 |
| 5,870,083 | 2/1999 | Shieh | 345/173 |
| 5,896,126 | 4/1999 | Shieh | 345/173 |

FOREIGN PATENT DOCUMENTS

| | | |
|---|---|---|
| 0 725 331 | 8/1996 | European Pat. Off. . |
| 0 747 807 | 12/1996 | European Pat. Off. . |
| 2 266 038 | 10/1993 | United Kingdom . |

OTHER PUBLICATIONS

Controler Interface fo Controller–Pilot Data Link Communications, Rankin Dept. EE, Mattson Dept. of Aviation, Mar. 1997 IEEE, pp. 7.1–19 to 7.1–25.

Adaptive Direct Manipulation, Riecken AT&T Bell Laboratories/Rutgers University, Aug. 1991, pp. 1115–1120.

PCT International Search Report, Jan. 14, 1999, PCT/US 98/18480.

"Mouse–Only Function Mapping", Mar. 1, 1992 IBM Technical Disclosure Bulletin, vol. 34, No. 10A, pp. 308–309.

"Mouse Emulation for Digitizer/Touch Panel", Dec. 1, 1990 IBM Technical Disclosure Bulletin, vol. 33, No. 7, pp. 216–217.

"Stylus–Based Interface with Full Mouse Emulation", Mar. 1992 IBM Technical Disclosure Bulletin, vol. 34, No. 10B, pp. 413–414.

*Primary Examiner*—Raymond J. Bayerl
*Assistant Examiner*—Thomas T. Nguyen
*Attorney, Agent, or Firm*—Jenkens & Gilchrist, P.C.

[57] ABSTRACT

A mouse mode manager for controlling operation of software objects on a display screen including a set of mouse mode buttons displayed on the display screen, the mouse mode buttons for selecting mutually exclusive operating modes of the software objects in response to a user supplied stimulus. To change the operating mode of the software objects a user stimulates the mouse mode button corresponding to the desired operating mode either by touching a touch sensitive screen over the desired mouse mode button or by pointing and clicking a mouse while the pointer is over the desired mouse mode button. The mouse mode manager stores the selected mouse operating mode in a storage device and informs the software objects as to the current mouse mode status.

12 Claims, 3 Drawing Sheets

MOUSE MODE MANAGER AND VOICE ACTIVATION FOR NAVIGATING AND EXECUTING COMPUTER COMMANDS

BACKGROUND OF THE INVENTION

1. Technical Field of the Invention

The present invention pertains in general to man machine interfaces and, in particular, to a method and apparatus for controlling and modifying the operation of software objects running on a computing device.

2. Description of Related Art

Personal computers and other computing devices often provide the user with a Graphical User Interface in conjunction with a mouse or other pointing device as a man machine interface. The use of a mouse allows the user to vary the operation of software objects displayed on the display screen. For example, moving a mouse over the object without clicking the mouse button typically results in a help message being displayed on the display screen. On the other hand, clicking the mouse button while over the software object results in activation of a configuration routine. Furthermore, moving a mouse over the software object, clicking the mouse button without releasing the mouse button, and then moving the mouse results in a drag-and-drop operation.

On a touch sensitive display screen, however, there is no mouse with which to vary the operation of the software objects. Instead, the user touches the touch sensitive display screen over the software object and then removes their finger from the display screen to activate the software object in a manner akin to depressing the mouse button. Thus, the user is limited to defining the act of touching the touch sensitive display screen to a single operation. To overcome this limitation, users have either simply not been allowed to perform more than one operation per software object or were required to use keystroke sequences which needed to be memorized.

It would be advantageous therefore, to devise a method and apparatus for controlling and modifying the operating mode of software objects which are displayed on a display screen or running on a computing device which does not require the use of a mouse or keystroke sequences. It would further be advantageous if such a method and apparatus were suitable for use with either a touch sensitive screen, a mouse or voice activation.

SUMMARY OF THE INVENTION

The present invention comprises a mouse mode manager for controlling and modifying operation of software objects on a display screen or running on a computing device. The invention includes a set of mouse mode buttons displayed on the display screen, the mouse mode buttons for selecting mutually exclusive operating modes of the software objects and computer functions in response to a user supplied stimulus. To change the operating mode of the software objects a user stimulates the mouse mode button corresponding to the desired operating mode either by touching a touch sensitive screen over the desired mouse mode button or by pointing and clicking the mouse while the pointer is over the desired mouse mode button or by voice activation. The mouse mode manager stores the selected mouse operating mode in a storage device and informs the software objects as to the current mouse mode status. In a second embodiment, the software objects are activated through voice commands.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
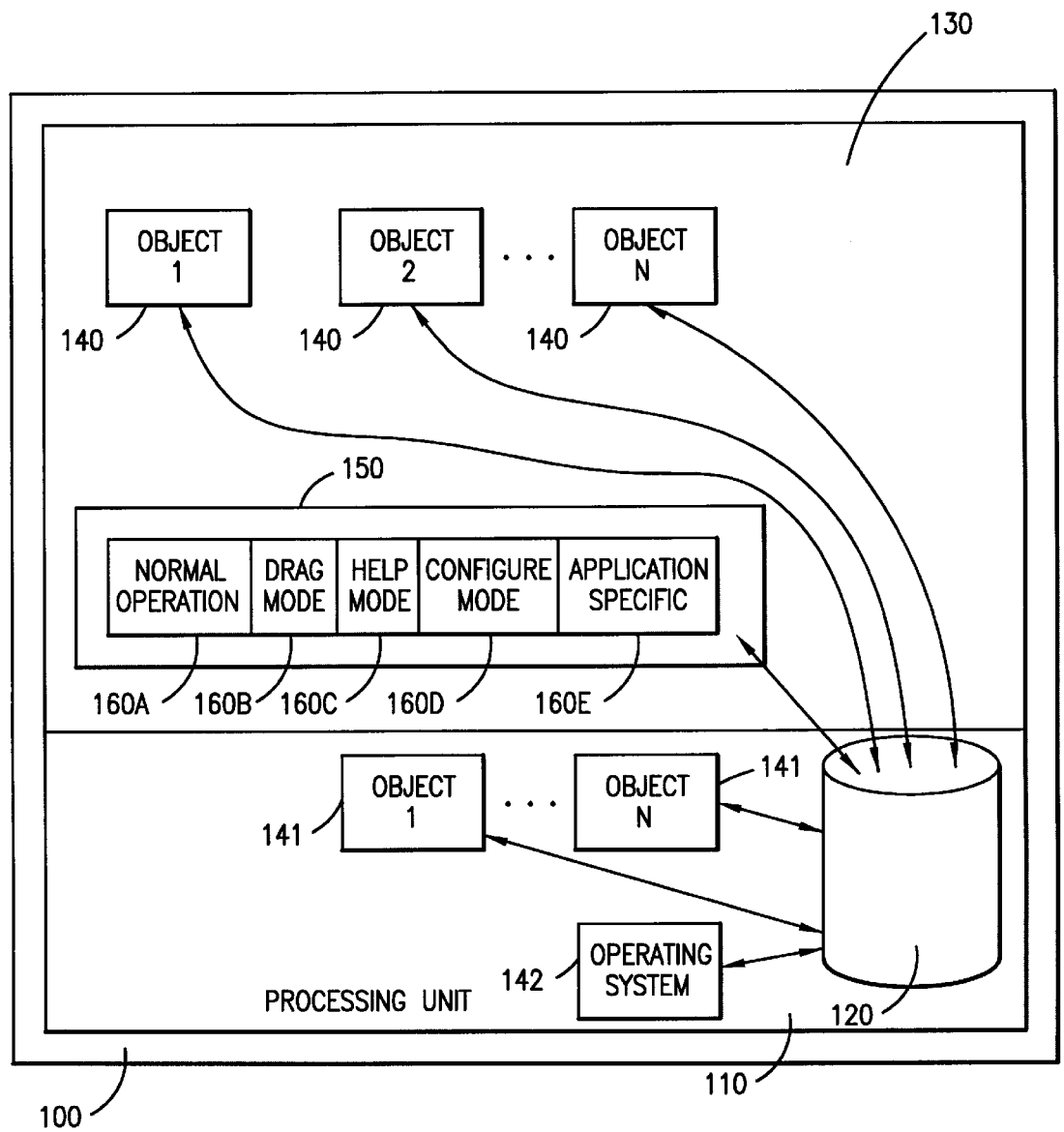
FIG. 1 is a functional block diagram of a mouse mode manager and a mouse mode panel executing on a computer.

Referring now to FIG. 1, there is illustrated a functional block diagram of a mouse mode manager and a mouse mode panel executing on a computer. A computer 100 comprises a processing unit 110, a storage device 120 and a display screen 130 including a touch sensitive display screen. A plurality of software objects 140 are stored in the storage device 120, executed on the processing unit 110 and displayed on the display screen 130. A plurality of software objects 141, such as a drop-and-drag manager, are also stored in the storage device 120 and are executed on the processing unit 110 but are not displayed on the screen 130. Furthermore, an operating system 142 is stored in the storage device 120 and is executed on the processing unit 110. A mouse mode panel 150 is displayed on the display screen 130 and comprises a plurality of mouse mode buttons 160. In a preferred embodiment, the mouse mode panel 150 includes a normal operation button 160A, a drag-and-drop mode button 160B, a help mode button 160C, a configuration mode button 160D and an application specific button 160E. Mouse mode manager software is stored in the storage device 120 and executed on the processing unit 110. The mouse mode manager software creates the mouse mode panel 150 displayed on the display screen 130.

Although the description of the preferred embodiment describes the use of a touch sensitive display screen 130, wherein, the user stimulates a mouse mode button 160 or a software object 140 or 141 or operating system 142 by touching the display screen 130 with a finger or other object, it is understood that the present invention is also applicable when using other input devices such as a mouse or voice activation. Furthermore, it is understood that while the present invention controls and modifies operation of software objects displayed 140 and 141 running on a computing device, the control and operation is performed in conjunction with the operating system 142 in a manner consistent with the normal operation of a computing device.

The mouse mode manager implements the mouse mode panel 150 in such a manner that only one mouse mode button 160 is active at any given time and activation of one mouse mode button 160 results in the deactivation or locking out of all other mouse mode buttons 160. To activate the mouse mode buttons 160 the user touches the display screen 130 over the mouse mode button 160 representative of the manner of operation desired.

If the normal operation mode button 160A is active, stimulating the software object 140 by the user touching the display screen 130 over the software object 140 with no immediate release or by pointing and clicking the mouse over the software object 140 with no immediate release results in a bubble help message being displayed. Touching the display screen 130 over the software object 140 followed by an immediate release or by pointing and clicking the mouse over the software object 140 followed by an immediate release or by speaking an associated command results in activation of the software object 140.

If the drag-and-drop mode button 160B is active, stimulating the software object 140 by the user touching the display screen 130 over the software object 140 with no immediate release or by pointing and clicking the mouse over the software object 140 with no immediate release, results in the drag-and-drop manager being informed that the software object 140 is currently being dragged. While in this mode, the software object 140 moves in response to movements of the finger touching the display screen 130 or to movements in the mouse pointer. The software object 140 drops when the finger releases from the display screen 130 or when the mouse button is released.

Touching the display screen 130 over the software object 140 followed by an immediate release or by pointing and clicking the mouse over the software object 140 followed by an immediate release results in the drag-and-drop manager being informed that the software object 140 is currently being dragged and the next software object capable of receiving the dragged software object 140 to be stimulated receives the software object 140. An example of this is when a software object is moved from one directory display to another directory display. In certain operations involving the drag-and-drop, the operating system 142 is also invoked. This is the case in the given example where the operating system 142 updates the current memory directory in which the software object 140 is listed.

If the help mode button 160C is active, stimulating the software object 140 by the user touching the display screen 130 over the software object 140 followed by an immediate release or by pointing and clicking the mouse over the software object 140 followed by an immediate release or by speaking an associated command results in a full help message to be displayed on the display screen 130. While the help message described activated in the normal operation mode displays a short message such as the name or operation of the software object, the help message displayed in the help mode is a more detailed message.

If the configuration mode button 160D is active, stimulating the software object 140 by the user touching the display screen 130 over the software object 140 followed by an immediate release or by pointing and clicking the mouse over the software object 140 followed by an immediate release or by speaking an associated command results in configuration options to be displayed on the display screen 130.

Figure 2:
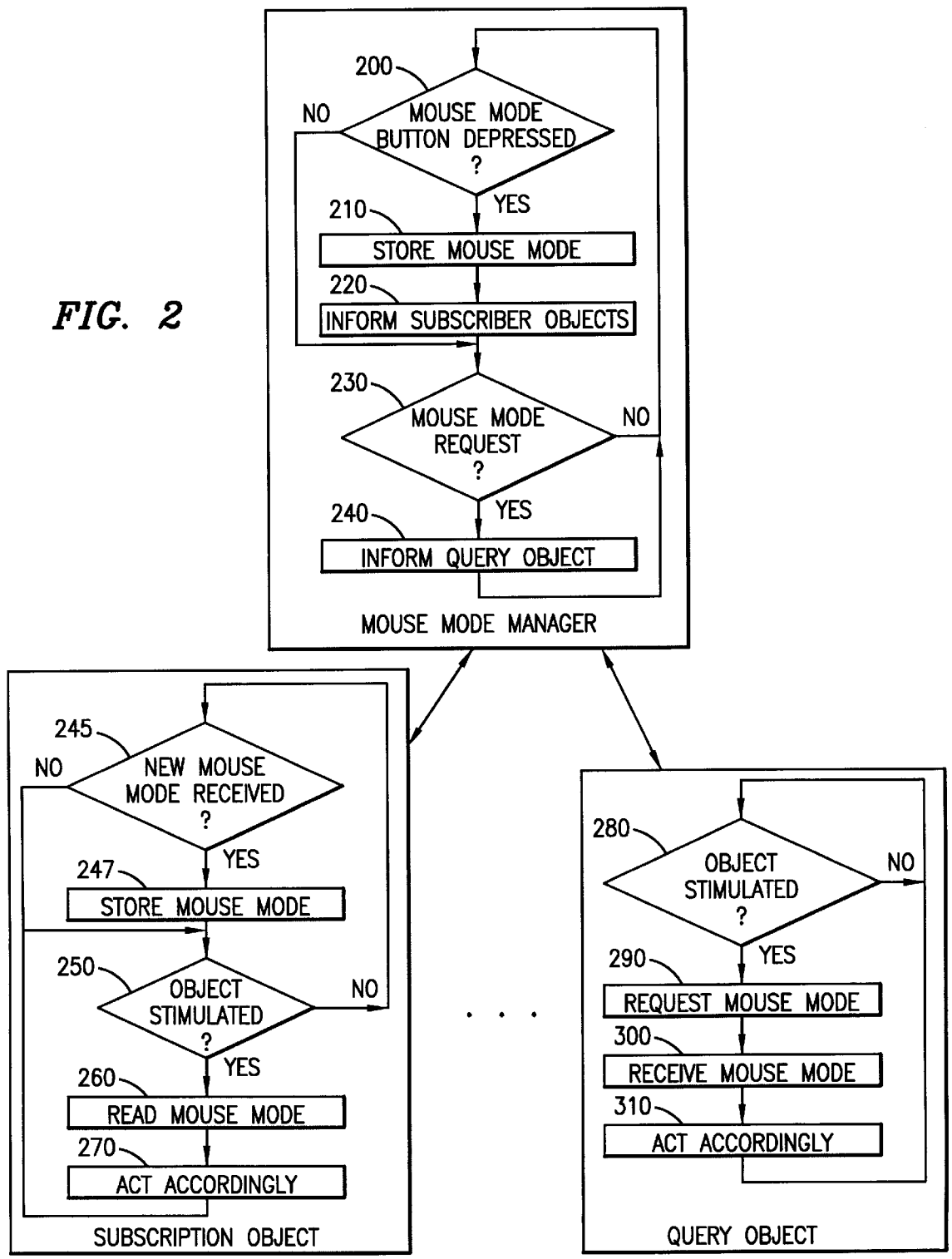
FIG. 2 is a flow diagram of a method for implementing a mouse mode manager.

Referring additionally now to FIG. 2, there is illustrated a flow diagram of a method for implementing a mouse mode manager. Each software object is either a subscription software object or a query software object. Subscription software objects are informed by the mouse manager whenever the mouse mode changes while query software objects make a request to the mouse mode manager to obtain the current mouse mode whenever the particular query software object has been stimulated.

The mouse mode manager repeatedly monitors the mouse mode panel to determine if one of the mouse mode buttons has been newly activated (step 200). If the mouse mode manager detects that one of the mouse mode buttons has been activated, the mouse mode manager stores the new mouse mode (step 210) and informs subscriber software objects of the new mouse mode (step 220). If, on the other hand, the mouse mode manager fails to detect the activation of a mouse mode button in step 200 or after informing the subscriber software objects of the new mouse mode in step 220, the mouse mode manager determines whether one of the query software objects has requested to be informed of the mouse mode (step 230). If there is a request, the mouse mode manager informs the requesting query software object of the mouse mode (step 240) and, in either event, the mouse mode manager returns to monitoring the mouse mode panel in step 200.

A subscription software object repeatedly monitors to determine if the mouse mode manager has communicated a new mouse mode (step 245). If a new mouse mode was received, the subscription software object stores the new mouse mode (step 247). After storing the mouse mode or if no new mouse mode was received, the subscription software object determines if the software object has been stimulated (step 250). If the software object has not been stimulated the software object returns to step 245 to determine if a new mouse mode is to be received, otherwise, if the software object has been stimulated, the software object reads the stored mouse mode (step 260). Based on the mouse mode, the software object acts accordingly (step 270) in response to object stimulation and then returns to motioning for a newly received mouse mode in step 245.

A query software object repeatedly monitors to determine if the software object has been stimulated (step 280). If the software object has been stimulated, the software object requests the mouse mode from the mouse mode manager (step 290). The query software object then receives the mouse mode from the mouse mode manager (step 300) and based on the mouse mode, the software object acts accordingly (step 310) in response to object stimulation and then returns to motioning for software object stimulation in step 280.

Figure 3:
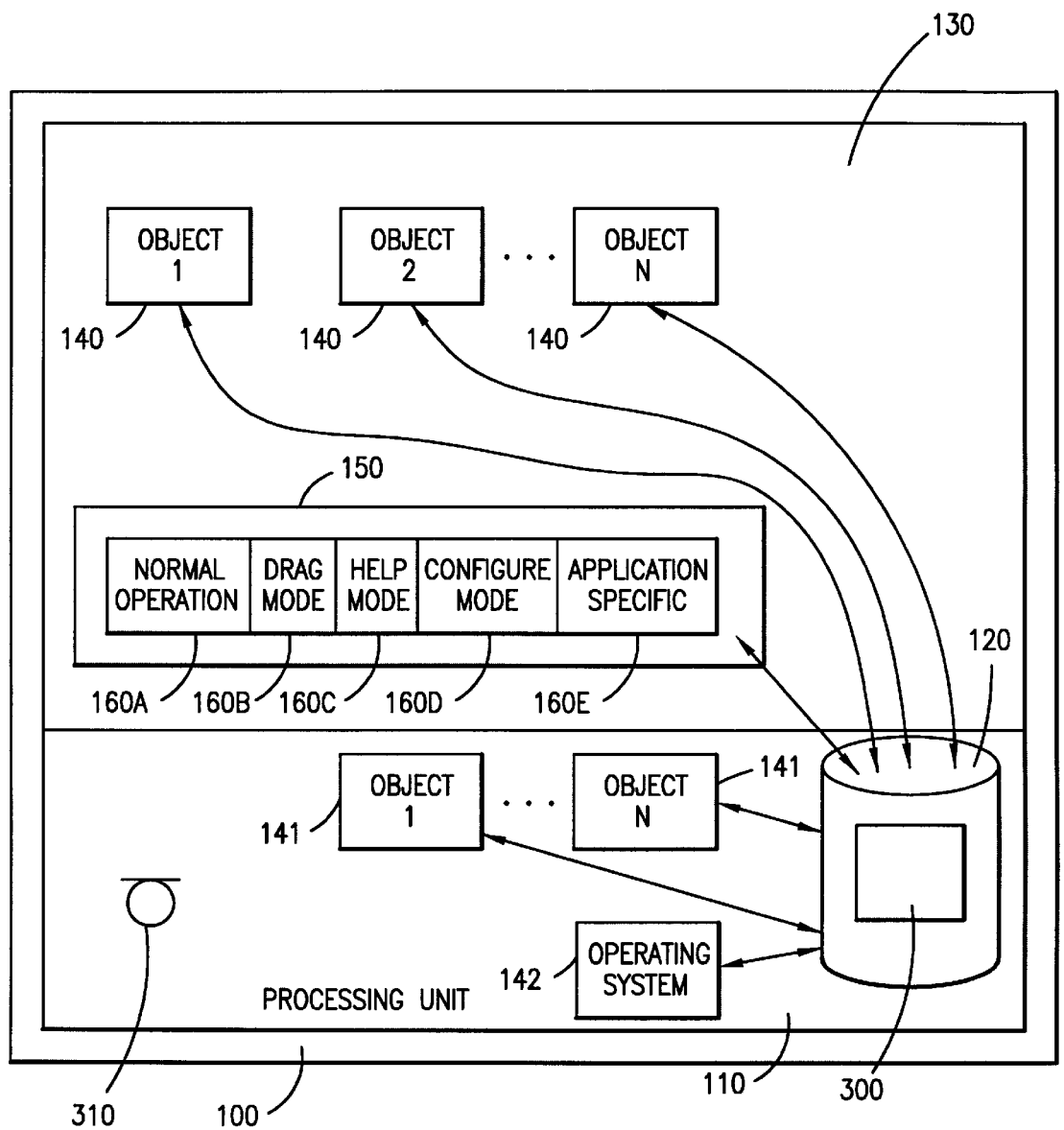
FIG. 3 is a functional block diagram of a voice activated system for executing commands on a computer.

Referring additionally now to FIG. 3, there is illustrated a functional block diagram of a voice activated system for executing commands on a computer. A computer 100 comprises a processing unit 110, a storage device 120, a microphone 310 and a display screen 130. A plurality of software objects 140 are stored in the storage device 120, executed on the processing unit 110 and displayed on the display screen 130. A plurality of software objects 141, such as a drop-and-drag manager, are also stored in the storage device 120 and are executed on the processing unit 110 but are not displayed on the screen 130. Furthermore, an operating system 142 is stored in the storage device 120 and is executed on the processing unit 110. A mouse mode panel 150 is displayed on the display screen 130 and comprises a plurality of mouse mode buttons 160. In a preferred embodiment, the mouse mode panel 150 includes a normal operation button 160A, a drag-and-drop mode button 160B, a help mode button 160C, a configuration mode button 160D and an application specific button 160E. Mouse mode manager software is stored in the storage device 120 and executed on the processing unit 110. The mouse mode manager software creates the mouse mode panel 150 displayed on the display screen 130. A list of voice commands and associated actions 300 to be performed on the software objects 140 and 141 or the operating system 142 or the mouse mode panel 150 is stored in the storage device 120. The processing unit monitors the microphone 310 to detect user spoken commands. When a spoken command is detected it is compared against voice commands stored in the list 300 using any voice recognition system which are common in the industry. Upon detecting a match between the spoken command input through the microphone 310 and voice commands stored in the list 300, the processing unit executes the associated action.

Although the preferred embodiment of the method and apparatus of the present invention has been described for use on a touch sensitive display screen, the method and apparatus is equally applicable to other embodiments using other pointing devices such as a mouse or light pen among others. Furthermore, while a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for selecting an active mouse operation mode comprising:

displaying a plurality of software objects within a first portion of a display screen;

displaying a plurality of active mouse mode buttons within a second portion of the display screen, the plurality of active mouse mode buttons representative of a respective plurality of active mouse operation modes capable of being supported by the software objects, the plurality of active mouse mode buttons for selecting mutually exclusive active mouse operation modes in response to an associated stimulus;

detecting stimulation of one of the mouse mode buttons within the second portion of the display screen to select one of the active mouse mode operation modes;

detecting a subsequent stimulation of a certain software object within the second portion of the display screen; and implementing the selected active mouse operation mode on that subsequently selected certain software object.

2. The method recited in claim 1, wherein the step of informing the software objects as to the mouse operation mode further includes the steps of:

detecting a mouse operation mode request from a query software object; and communicating the mouse operation mode to the query software object in response to the detected request.

3. The method recited in claim 1, wherein one of the plurality of active mouse operation modes comprises a software object activation operation, and the step of implementing comprises the step of activating that subsequently stimulated software object.

4. The method recited in claim 1, wherein one of the plurality of active mouse operation modes comprises a drop-and-drag operation, and the step of implementing comprises the step of dragging and dropping that subsequently stimulated software object.

5. The method recited in claim 1, wherein one of the plurality of active mouse operation modes comprises a help operation, and the step of implementing comprises the step of displaying a help message associated with that subsequently stimulated software object.

6. The method recited in claim 1, wherein one of the plurality of active mouse operation modes comprises a configuration operation, and the step of implementing comprises the step of displaying configuration options associated with that subsequently stimulated software object.

7. A method for changing operation of a subscription software object displayed on a display screen comprising the steps of:

selecting one of a plurality of active mouse operation modes from a mouse mode manager in response to stimulation of one of a corresponding plurality of active mouse mode buttons;

storing the selected active mouse operation mode in association with the subscription software object;

detecting a subsequent stimulation of the subscription software object;

operating the subscription software object in a manner corresponding to the selected active mouse operation mode in response to the detected subsequent stimulation of the software object.

8. The method recited in claim 7, wherein one active mouse operation mode comprises a software object activation operation, and the step of operating comprises the step of activating that subsequently stimulated software object.

9. The method recited in claim 7, wherein one active mouse operation mode comprises a help operation, and the step of operating comprises the step of displaying a help message associated with that subsequently stimulated software object.

10. The method recited in claim 7, wherein one active mouse operation mode comprises a drag-and-drop operation, and the step of operating comprises the step of dragging and dropping that subsequently stimulated software object.

11. The method recited in claim 7, wherein one active mouse operation mode comprises a configuration operation, and the step of operating comprises the step of displaying configuration options associated with that subsequently stimulated software object.

12. A mouse mode manager for selecting an active mouse operation mode comprising:

a set of software objects displayed on a display screen that may be stimulated;

a set of active mouse mode buttons displayed on the display screen, the buttons for selecting mutually exclusive active mouse operation modes of the software objects in response to a stimulation of one active mouse mode button;

storing a list of voice commands in association with certain stimulations of the active mouse mode buttons and software objects;

inputting first and second spoken commands;

recognizing the first and second spoken commands as requesting a first stimulation of a mouse mode button followed by a second stimulation of a software object; and implementing the mouse operation mode corresponding to the stimulated mouse mode button on the subsequently stimulated software object.

* * * * *